(12) United States Patent
Tessmer et al.

(10) Patent No.: US 11,968,078 B2
(45) Date of Patent: Apr. 23, 2024

(54) MAINTAINING NETWORK MEMBERSHIP WHEN DISCONNECTED FROM A CONTROLLER

(71) Applicant: Nicira, Inc., Palo Alto, CA (US)

(72) Inventors: Alexander Tessmer, San Jose, CA (US); Ganesan Chandrashekhar, Campbell, CA (US); Vivek Agarwal, Campbell, CA (US); Subin Cyriac Mathew, San Jose, CA (US); Ankur Kumar Sharma, Mountain View, CA (US)

(73) Assignee: Nicira, Inc., Palo Alto, CA (US)

( * ) Notice: Subject to any disclaimer, the term of this patent is extended or adjusted under 35 U.S.C. 154(b) by 247 days.

(21) Appl. No.: 15/654,195

(22) Filed: Jul. 19, 2017

(65) Prior Publication Data

US 2019/0028328 A1 Jan. 24, 2019

(51) Int. Cl.
H04L 41/0668 (2022.01)
H04L 43/0811 (2022.01)
H04L 45/64 (2022.01)

(52) U.S. Cl.
CPC ...... *H04L 41/0668* (2013.01); *H04L 43/0811* (2013.01); *H04L 45/64* (2013.01)

(58) Field of Classification Search
CPC ... H04L 41/0668; H04L 43/0811; H04L 45/64
See application file for complete search history.

(56) References Cited

U.S. PATENT DOCUMENTS

| | | | | |
|---|---|---|---|---|
| 10,083,026 | B1 * | 9/2018 | Venkata | G06F 8/656 |
| 2013/0322443 | A1 * | 12/2013 | Dunbar | H04L 12/185 |
| | | | | 370/390 |
| 2015/0055651 | A1 | 2/2015 | Shen et al. | |
| 2015/0172165 | A1 * | 6/2015 | Tessmer | H04L 45/02 |
| | | | | 370/254 |
| 2015/0381484 | A1 * | 12/2015 | Hira | H04L 45/64 |
| | | | | 370/390 |
| 2015/0381494 | A1 * | 12/2015 | Cherian | H04L 45/745 |
| | | | | 370/392 |
| 2016/0077935 | A1 * | 3/2016 | Zheng | G06F 11/2028 |
| | | | | 714/4.12 |
| 2016/0156504 | A1 * | 6/2016 | Wang | H04L 41/0695 |
| | | | | 370/217 |

(Continued)

OTHER PUBLICATIONS

VXLAN Overview: Cisco Nexus 9000 Series Switches, White Paper, CISCO, C11-729383-01, 2015, 10 pages.

*Primary Examiner* — Jasper Kwoh
(74) *Attorney, Agent, or Firm* — King Intellectual Asset Management

(57) ABSTRACT

Exemplary methods, apparatuses, and systems maintain network membership information for a host when it is disconnected from a controller. When the host detects a loss of connectivity with the network controller, the host identifies and selects one or more hosts that are members of a control logical network. The control logical network includes hosts configured to run data compute nodes that are members of the overlay network, regardless of whether or not each of the hosts is currently running a data compute node that is a member of the overlay network. The host then sends any broadcast, unknown destination, or multicast (BUM) data packet(s) to the selected one or more hosts.

20 Claims, 5 Drawing Sheets

(56) References Cited

U.S. PATENT DOCUMENTS

2017/0237650 A1* 8/2017 Beeram ................ H04L 12/18
　　　　　　　　　　　　　　　　　　　　370/390
2017/0331746 A1* 11/2017 Qiang .................. H04L 45/16
2018/0302242 A1* 10/2018 Hao ................. H04L 12/4641
2019/0036736 A1* 1/2019 Gao ................. H04L 12/4633

* cited by examiner

MAINTAINING NETWORK MEMBERSHIP WHEN DISCONNECTED FROM A CONTROLLER

FIELD OF THE INVENTION

The various embodiments described in this document relate to the management of overlay network membership during a control plane disruption.

BACKGROUND OF THE INVENTION

To transfer data amongst computers, data packets are sent from a source device to a destination device using an address, or other identifying information, for the destination device. For example, the source device may use an IP (Internet Protocol) address and/or MAC (Media Access Control) address to direct data to the appropriate destination device. In a software defined data center, a controller collects and sends identifying information regarding which virtual machines (VMs) are members of a logical or overlay network. This information is received by individual hosts, which use the information to send data to other hosts. However, when there is a disruption to the connection between the controller and a host, the host may still be able to communicate with other hosts but not have accurate or up-to-date membership information (e.g., a listing of VMs in the logical network that was updated during the disconnection between the host and controller). As a result, the host may not be able to communicate with new members of the network, e.g., when sending broadcast, unknown destination, or multicast data packets.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

This document describes embodiments that implement a method of transmitting data packets between hosts in an overlay network after a loss of connection between a host and a controller. Hosts are configured to receive and maintain information from the controller regarding membership information for data compute nodes (e.g., virtual machines) that are members of the overlay network. The hosts are further configured to receive and maintain information regarding the hosts that are part of a control logical network. The control logical network includes hosts configured to run data compute nodes that are members of the overlay network, regardless of whether or not each of the hosts is currently running a data compute node that is a member of the overlay network. Thus, hosts that are currently running data compute nodes that are members of the overlay network may be a subset of the hosts that are a part of the control logical network at a given point in time. Using a process as described in this document, a host that detects a loss of connectivity with the network controller identifies and selects one or more hosts that are members of the control logical network. The host then sends any broadcast, unknown destination, or multicast (BUM) data packet(s) to the selected one or more hosts. This process eliminates the problem of the host having outdated or out-of-sync membership information for the overlay network when the host is disconnected from the controller.

Figure 1:
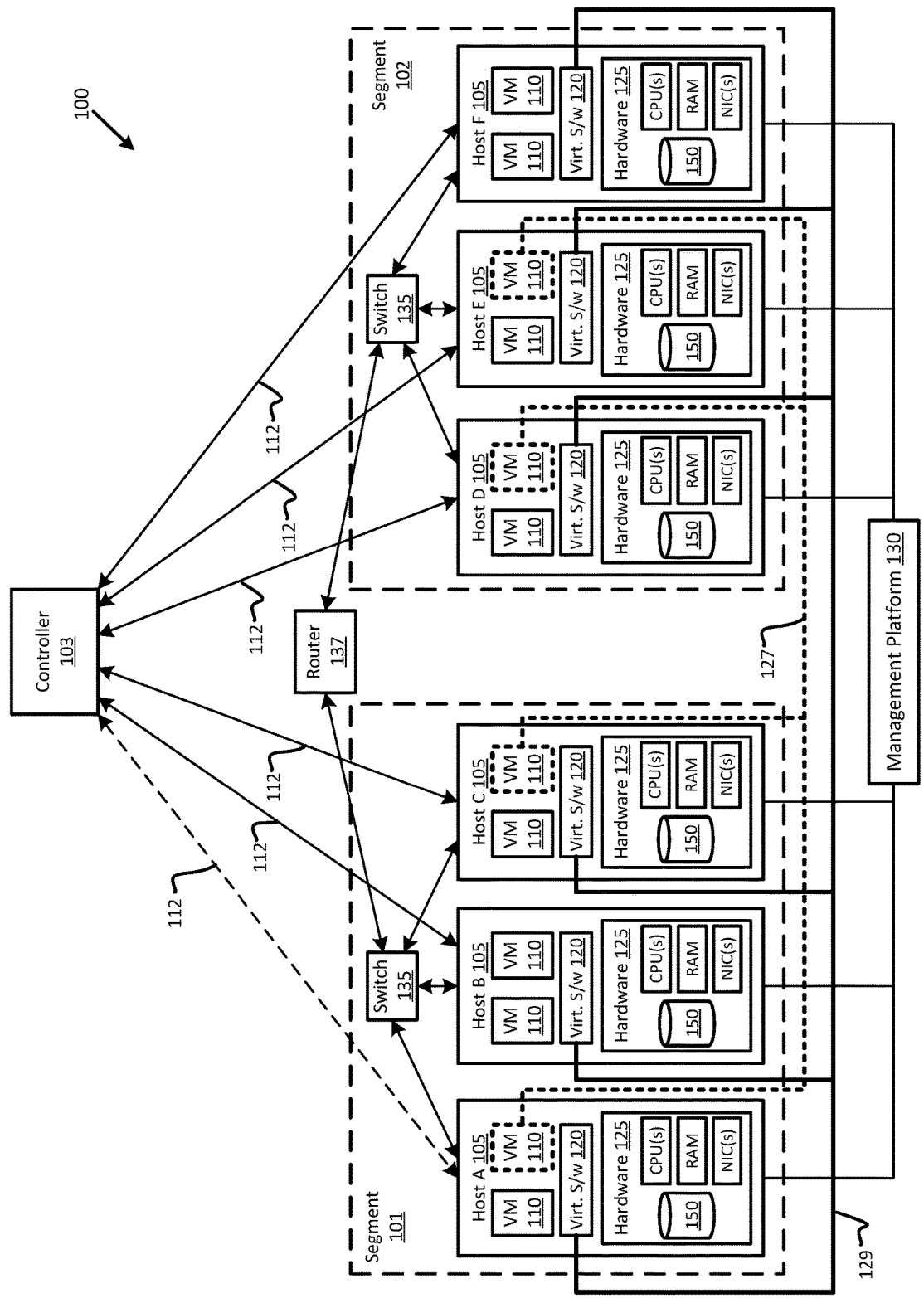
FIG. 1 illustrates, in block diagram form, an exemplary computing environment, including one or more networked hosts configured to maintain network membership in response to control plane disruption.

FIG. 1 illustrates, in block diagram form, exemplary computing environment 100, including one or more networked hosts 105 configured to maintain network membership in response to control plane disruption. This document may also refer to hosts 105 as nodes, computers, processing devices, and/or servers. In one embodiment, one or more VMs 110 implement a virtualized computer, that can provide computing services such as a network server, remote productivity desktop or some networking, storage, or security service (e.g., a firewall, webserver, database server, etc.). Although not shown, one or more of VMs 100 may include containerized applications, or be generally referred to as data compute nodes (DCNs) which could include application containers as further described below.

Hardware 125 includes one or more processors ("CPU(s)"), data storage and memory (e.g., "RAM"), and network interface controllers ("NIC(s)"). Node 105 uses the data storage and memory for storing data, metadata, and programs for execution by the processor(s). The data storage and memory may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic storage devices, optical storage devices, etc. The memory may be internal or distributed memory. In one embodiment, hardware includes local storage 150.

One or more buses may interconnect the various components of hardware 125. Additionally, the network interface controllers may connect nodes 105, via a wired or wireless network, with one another.

Virtualization software 120 runs on hardware 125 of host server or node (e.g., a physical computer) 105. Virtualization software 120 manages VMs 110 and physical resources, such as hardware 125. Additionally, virtualization software 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within local storage 150 accessible by VMs 110 residing in one or more nodes 105.

It will be apparent from this description that aspects of the inventions may be embodied, at least in part, in software. That is, computer-implemented methods 200 and 300 may be carried out in a computer system or other data processing system, such as nodes 105, in response to its processor executing sequences of instructions contained in a memory or another non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105, and, in some embodiments, fewer components than that shown in FIG. 1 may also be used in nodes 105.

Controller 103 collects and distributes information to nodes 105 in the overlay (logical) network, including information regarding hosts 105 that have VMs 110 that are part of the overlay network. For example, when the overlay network includes VMs 110 depicted as dashed boxes and connected by dashed line 127 in FIG. 1, controller 103 sends information to each of the hosts 105, including information regarding each host 105 that houses one or more of the VMs 110 in the overlay network. The information can include a destination address of the hosts 105 to allow packet transmission to the hosts 105. For example, controller 103 may send a link layer and internet layer address for each active VM 110 within the overlay network. In one embodiment, controller 103 communicates and/or transmits the information to nodes 105 via communication channels 112. In one embodiment, communications channels 112 are TCP connections used to transmit only overlay network membership information. Each communication channel 112 may be implemented over a physical network infrastructure which may include switches 135 and router 137, or over a distinct management network (not shown) comprising physical network components distinct from the physical network infrastructure that includes switches 135 and router 137. Communication channels 112 connect controller 103 with a local control-plane agent on each of the hosts 105. In one embodiment, controller 103 maintains and distributes additional information for the implementation of the overlay network. In one embodiment, controller 103 collects information from endpoints. For example, each host 105 may implement a VTEP (VXLAN (Virtual Extensible LAN) Tunnel Endpoint) (not shown) to encapsulate "logical" layer 2 packets and transmit the encapsulated packets (e.g., via the underlying physical layer 3 network) to other segments that make up the overlay network. In one embodiment, virtualization software 120 includes a VTEP. VTEPs may additionally support tunneling protocols other than VXLAN, such as Geneve, STT, or NVGRE. Controller 103 distributes endpoint information to each of the endpoints within the overlay network. The information may include a network segment identifier, an IP address, and a MAC address for each endpoint. The segment identifier uniquely identifies a physical network segment (e.g., an L2 broadcast domain) on which a host resides. Controller 103 sends the information for the endpoints proactively or in response to a request from hosts 105 in the overlay network. In one embodiment, hosts 105 store the information from controller 103 in local storage 150, e.g., in a table or any other suitable data structure.

In addition to the overlay network connecting hosts 105 having VMs 110, each host 105 joins a control network, depicted using solid line 129. The control network includes all hosts 105 in computing environment 100, regardless of whether each host 105 includes VMs 110 that are current members of the overlay network. In one embodiment, hosts 105 join the control network using a control virtual network identifier (VNI). In one embodiment, the control VNI is an identifier used to identify all hosts 105 that are members of the control network. The control VNI can be stored by each of hosts 105 in local storage 150, e.g., in a control network table or any other suitable data structure. In one embodiment, the control network table also includes unique identifiers and addresses associated with each of the one or more hosts 105 in the control network. The control network 129 is therefore a logical overlay network over which hosts 105 may communicate. Although depicted by a solid line, communication over this network is implemented using the physical network infrastructure including switches 135 and router 137 to carry encapsulated packets according to outer header information added by the VTEPs.

Management platform 130 enables an administrator to manage the configuration of computing environment 100. In one embodiment, management platform 130 provides a management console for manual and automated control of nodes 105, VMs 110, and hardware 125. For example, management platform 130 may provision, configure, and maintain VMs 110 as virtual desktops or network services, manage pools of computer resources to run VMs 110, etc. In one embodiment, management platform 130 groups one or more hosts 105 and the VMs 110 contained in the one or more hosts 105 into a network segment. For example, segment 101 includes hosts A-C 105 and segment 102 includes hosts D-F 105 in FIG. 1, and each segment is represented by dashed rectangular boxes. Each network segment 101 and 102 includes a group of hosts 105 coupled to switch 135. Local data packets (e.g., layer 2 packets) can be sent between hosts 105 within the same segment without encapsulation. An endpoint, however, encapsulates local data packets sent from one host 105 in one network segment to another host 105 in another network segment. In an alternative embodiment, management platform 130 defines the overlay network and passes the definitions to controller 103 to distribute information to switch 135 and routers 137 to group one or more hosts 105 into network segments. Additional details can be found in U.S. Pat. No. 9,432,204, entitled "Distributed multicast by endpoints," which is incorporated by reference herein in its entirety.

In some embodiments, when a host 105 in one segment (e.g., segment 101) sends a BUM data packet to multiple hosts 105 in another network segment (e.g., segment 102), transmitting host 105 can select one host 105 in the other network segment (e.g., a proxy endpoint or multicast tunnel endpoint (MTEP)) to receive the data packet and the selected host 105 replicates and transmits the data packet to the other hosts in the network segment. In one embodiment, management platform 130 selects the proxy endpoint for each network segment randomly. In other embodiments, management platform 130 selects the proxy endpoint for each network segment intelligently using a load balancing algorithm. In other embodiments, transmitting host 105 selects the proxy endpoint for each network segment. Each proxy endpoint replicates the data packet to all other endpoints belonging to the particular replication group within the proxy endpoint's own network segment.

Switch 135 is a network device that receives, processes, and forwards data from a source to a destination. For example, switch 135 within segment 101 forwards local data traffic (e.g., layer 2 traffic) between hosts 105 in segment 101. In one embodiment, when a source host 105 in one network segment (e.g., segment 101) sends the data packet to a destination host 105 in another network segment (e.g., segment 102), VTEP of source host 105 encapsulates the local data traffic, and switch 135 in network segment 101 forwards the encapsulated data packet to router 137. In such embodiments, router 137 forwards the encapsulated data packet via the underlying network to switch 135 in network segment 102 for transmission to the VTEP of the destination host 105.

In another embodiment, switch 135 within segment 101 receives an encapsulated data packet from a VTEP of host A

105 and processes and forwards the encapsulated data packet to one or more of other hosts 105 in segment 101. In such embodiments, switch 135 forwards the data packet to each of the VTEP(s) of the destination host(s) 105 in segment 101.

Figure 2:
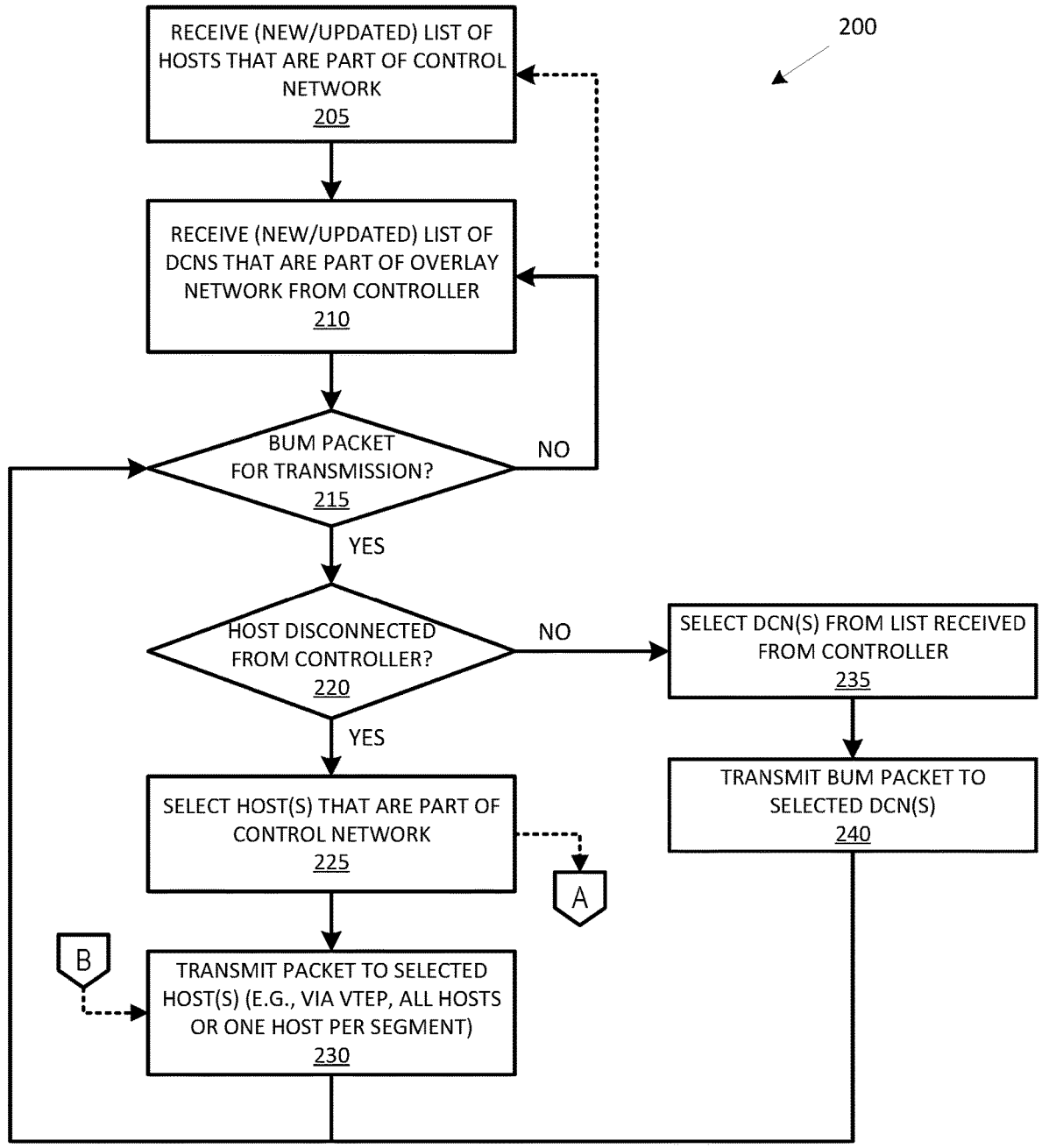
FIG. 2 is a flow chart illustrating an exemplary method of transmitting data packets between hosts in a computing environment.

FIG. 2 is a flow chart illustrating exemplary method 200 of transmitting data packets between hosts 105 in computing environment 100.

At block 205, host 105 receives a new or an updated list of hosts 105 that are part of a control network. The control network includes hosts configured to run data compute nodes that are members of an overlay network, regardless of whether or not each of the hosts is currently running a data compute node that is a member of the overlay network. In one embodiment, membership in the control network is defined by the control VNI and membership in the overlay network is defined by the VNI. For example, the overlay network includes active VMs 110 (e.g., DCNs) that are associated with the same VNI. The DCNs that are part of the overlay network reside on hosts 105 that have the same control VNI. In one embodiment, management platform 130 distributes the control VNI, in addition to identifiers and addresses of each host 105 in computing environment 100, to each host 105. In FIG. 1, solid line 129 connecting hosts A-F 105 indicates the membership of the control network. In one embodiment, the control network includes hosts 105 configured to run DCNs that are members of the overlay network regardless of whether or not each of the hosts 105 is currently running a DCN that is a member of the overlay network. When new hosts 105, managed by management platform 130, are added to or removed from computing environment 100, management platform 130 sends an updated list of hosts 105 in the control network to hosts 105 or, alternatively, sends an update that includes information regarding only a specific addition or removal to be made to the list of hosts 105 so that each host has a current and correct list of hosts. In one embodiment, host 105 stores the new or updated list of hosts 105 in the control network in local storage 150 or another memory device. In one embodiment, the list of hosts 105 in the control network is a table, or other data structure, that stores information for each host 105 in the control network, including one or more of an identifier, an address, and a network segment identifier.

At block 210, host 105 receives a new or an updated list of data compute nodes (DCNs) that are part of an overlay network from controller 103. In one embodiment, the DCNs that are part of the overlay network have the same virtual network identifier (VNI), where the VNI is different from the control VNI. Controller 103 sends the new or updated list of DCNs and corresponding hosts on which they reside (e.g., VMs 110) to hosts 105 over communication channels 112. For example, in response to initiation of one or more VMs 110, controller 103 sends information for the one or more added VMs 110 to hosts 105 that have DCNs on the same overlay network (designated by its VNI) as the initiated VM over respective communication channels 112. In one embodiment, host 105 stores the new or updated list of DCNs in local storage 150 or another memory device. In one embodiment, the list of DCNs is a table, or other data structure, that stores information for each DCN in the overlay network, including one or more of an identifier, an address, and a network segment identifier.

At block 215, host 105 determines whether a VM 110 within host 105 has a Broadcast, Unknown Destination, Multicast (BUM) packet for transmission. In one embodiment, host 105 floods BUM packets to all destinations (e.g. VMs 110) with the same virtual network identifier. This may be carried out, as further described below, by replicating the packet to hosts having DCNs residing thereon with a VNI that is the same as the VNI associated with the source logical interface (e.g., virtual network interface (VNIC)) of the BUM packet.

When host 105 determines that the data packet is not a BUM packet, host 105 sends the data packet to its intended destination using a unique address for the destination (e.g., an IP address, a MAC address, etc.), and returns to block 210 to monitor for any changes to the list of DCNs (e.g., VMs 110) that are part of the overlay network, and optionally to block 205 to monitor for any changes to the list of hosts 105 that are part of the control network. If the destination MAC address is for a DCN on a different host (according to information provided by manager 130), the packet may be encapsulated via a VTEP on the host for transmission over the physical underlay to the host on which the destination DCN resides. The destination host would then decapsulate the packet and forward it to the destination DCN.

At block 220, when the originating host 105 determines that a VM 110 has a BUM packet for transmission, originating host 105 determines whether communication channel 112 between controller 103 and host 105 is connected or disconnected. When communication channel 112 between controller 103 and host 105 is disconnected, controller 103 is unable to propagate changes in the network topology to the disconnected host 105 (e.g., the addition or removal of VMs 110 or other DCNs to/from the overlay network).

At block 225, when communication channel 112 between controller 103 and originating host A 105 is disconnected, denoted by communication channel 112 being a dashed line, host A 105 enters a controller disconnected operation (CDO) state because disconnected host A 105 cannot be sure of the current state of the network topology. For example, disconnected host A 105 has no knowledge regarding newly activated VMs 110. Without this knowledge, disconnected host A 105 is at risk of sending BUM packet(s) to VMs 110 that were members of the overlay network prior to the disconnect but not to VMs 110 added to the overlay network after the disconnect.

In one embodiment, controller 103 takes no action when it determines that communication channel 112 between controller 103 and host A 105 is disconnected. In other words, controller 103 does not remove disconnected host A 105, maintaining the membership of disconnected host A 105 in the overlay network. In other embodiments, controller 103 does not immediately remove disconnected host A 105 as being a member of the overlay network. In such embodiments, a timeout period or pre-established amount of time passes to allow recovery of the connection between controller 103 and disconnected host A 105 before controller 103 removes disconnected host A 105 from the overlay network.

In the CDO state, disconnected host A 105 selects the hosts 105 that are part of the control network as destinations for the BUM data packet. In one embodiment, disconnected host A 105 selects the hosts 105 associated with the control VNI as destinations for the data packet. In one embodiment, disconnected host A 105 optionally determines whether the destination hosts 105 of the BUM packet includes two or more hosts 105 with a same network segment identifier (e.g., by proceeding with method 300 at block 305 via off-page connector A). When disconnected host A 105 determines that there are two or more hosts 105 with the same network segment identifier, disconnected host A 105 selects one of the two or more hosts 105 to act as the proxy endpoint (e.g., MTEP). The proxy endpoint can be selected randomly, round-robin, by controller 103, or based on the amount of traffic flowing through each of the two or more hosts. In another embodiment, disconnected host A 105 selects all hosts 105 within the control network.

At block 230, disconnected host A 105 transmits the BUM packet to selected host(s) 105 using destination addresses for selected host(s) 105. In one embodiment, the BUM packet is encapsulated prior to being sent to another host 105 or to VMs 110 within transmitting host 105. In one embodiment, disconnected host A 105 replicates the BUM packet and transmits a replicated copy of the BUM packet to each of all other hosts 105 by unicasting the encapsulated BUM packet to the VTEPs of other hosts 105 associated with the control VNI. In other embodiments, disconnected host A 105 transmits the BUM packet to the VTEP of one host 105 per group of hosts 105 with a same network segment identifier.

After the BUM packet is transmitted to the selected host(s) 105, the flow returns to block 215 to determine if there are additional BUM packets for transmission.

In one embodiment, when disconnected host A 105 determines that communication channel 112 has been reestablished, e.g., between controller 103 and host A 105, now-reconnected host A 105 resumes normal operations for transmitting BUM packets to DCNs within the overlay network using the VNI.

At block 235, when communication channel 112 between controller 103 and host 105 is not disconnected, host 105 selects DCNs from the list received from controller 103. At block 240, host 105 transmits the BUM packet to the selected DCNs using the destination addresses of the selected DCNs. After the BUM packet is transmitted to the selected DCNs, the flow returns to block 215 to determine if there are additional BUM packets for transmission.

Figure 3:
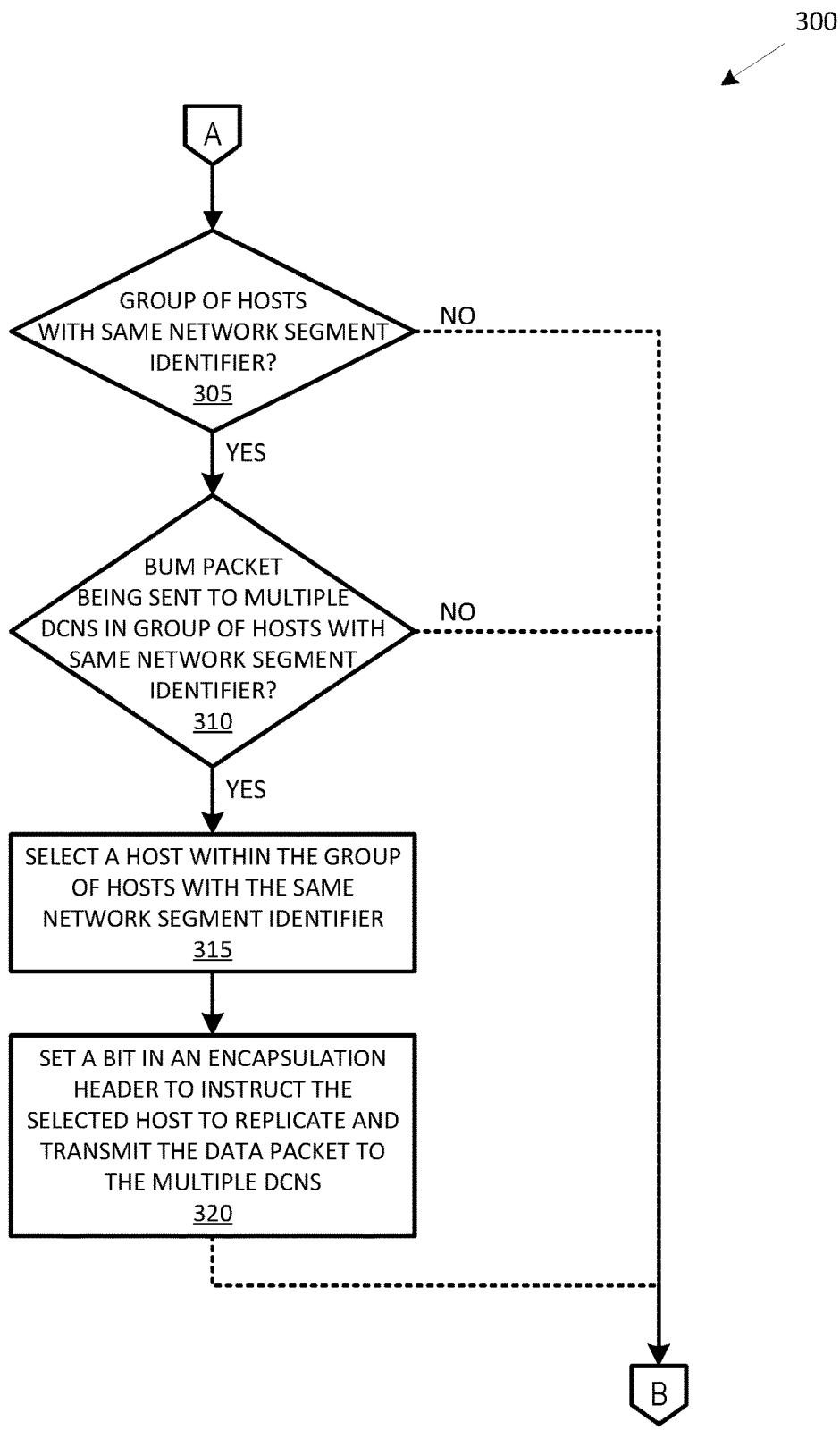
FIG. 3 is a flow chart illustrating an exemplary method of instructing destination hosts to replicate data packets.

FIG. 3 is a flow chart illustrating an exemplary method of instructing destination hosts 105 to replicate data packets.

At block 305, host 105 determines whether there is a group of destination hosts 105 with the same network segment identifier. For example, with reference to FIG. 1, host A 105 determines that hosts D-F 105 have the same network segment identifier, indicating that they are all in segment 102. If host 105 determines there is not a group of destination hosts 105 with the same network segment identifier, host 105 transmits the data packet to the destination hosts 105 (e.g., by proceeding with method 200 at block 230 via off-page connector B).

At block 310, host 105 determines whether the BUM packet is being sent to multiple DCNs in a group of destination hosts 105 with the same network segment identifier. After determining that there is a group of destination hosts 105 with the same network segment identifier, host 105 determines whether there are multiple DCNs (e.g., VMs 110) within the group of destination hosts 105 that are to receive the BUM packet. Returning to the example above, host 105 determines that host D 105 and host E 105 each include a VM 110 that should receive the BUM packet. If host 105 determines there is not a BUM packet is being sent to multiple DCNs in a group of destination hosts 105 with the same network segment identifier, host 105 transmits the data packet to the destination hosts 105 (e.g., by proceeding with method 200 at block 230 via off-page connector B).

At block 315, host 105 selects a host 105 within the group of hosts 105 with the same network segment identifier. In one embodiment, when host A 105 detects that communication channel 112 between controller 103 and host A 105 is disconnected, host A 105 implements a process to check its connections with other hosts 105 in the control network and to receive information regarding the status of communication channels 112 between the other hosts 105 in the control network and controller 103. For example, host A 105 implements a Bidirectional Forwarding Detection (BFD) session with each of the other hosts 105 in the control network. The BFD session can be configured in a demand mode (e.g., after establishing a session between two endpoints, no Hello packets are exchanged until called upon). In one embodiment, host A 105 configures the BFD session to receive a reply with additional metadata, including information as to whether communication channels 112 between each of the other hosts 105 in the control network is connected or disconnected. Other embodiments implement any other suitable detection protocols to for forwarding path failure detection.

Based on the status of connections between host A 105 and other hosts 105 in the control network, in addition to information regarding the status of communication channels 112 between the other hosts 105 in the control network and controller 103, host A 105 selects one host 105 per network segment. In one embodiment, the selected host is designated a Multicast Tunnel End-point (MTEP). For example, continuing the example, host A 105 selects host D 105 to receive the BUM packet, replicate the BUM packet, and transmit the replicated BUM packet to host E 105.

At block 320, host 105 sets a bit in an encapsulation header to instruct the selected destination host 105 to replicate and transmit the data packet to the one or more DCNs. In one embodiment, destination host 105, serving as a proxy endpoint, decapsulates the data packet, replicates the BUM packets, and transmits the BUM packets using the overlay network VTEP list, if destination host 105 has connectivity with controller 103 and is a member of the overlay network. In other embodiments, destination host 105 replicates and transmits the BUM packets using the control network VTEP list.

Figure 4:
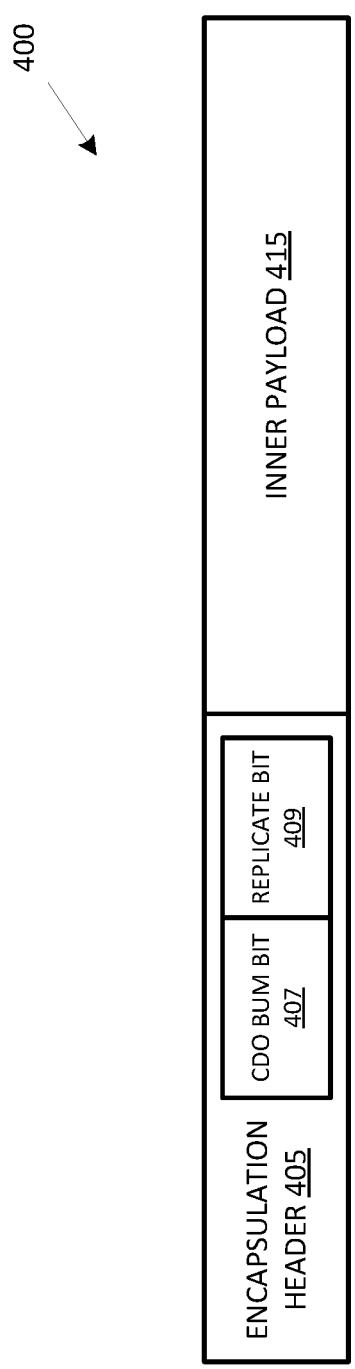
FIG. 4 illustrates, in block diagram form, an exemplary data packet including an encapsulation header.

FIG. 4 illustrates, in block diagram form, an exemplary data packet 400 including an encapsulation header 405 and an inner payload 415. The encapsulation header 405 includes CDO BUM bit 407 and replicate bit 409. CDO BUM bit 407 informs the selected destination host 105 that data packet 400 is a BUM packet from a host 105 in the CDO state. In one embodiment, the proxy endpoint (e.g., proxy host or MTEP) identifies that CDO BUM bit 407 has been set. In response, the proxy endpoint replicates the packet: (1) if the proxy endpoint does not have a working connection with controller 103, to all VTEPs in the network segment that are members of the control network; or (2) if the proxy endpoint has an active connection with controller 103, to only those VTEPs in the network segment which are members of the overlay network to which source VM 110 is also a member of.

Replicate bit 409 informs the selected destination host 105 that the packet is to replicated and transmitted to other DCNs in the network segment.

Figure 5:
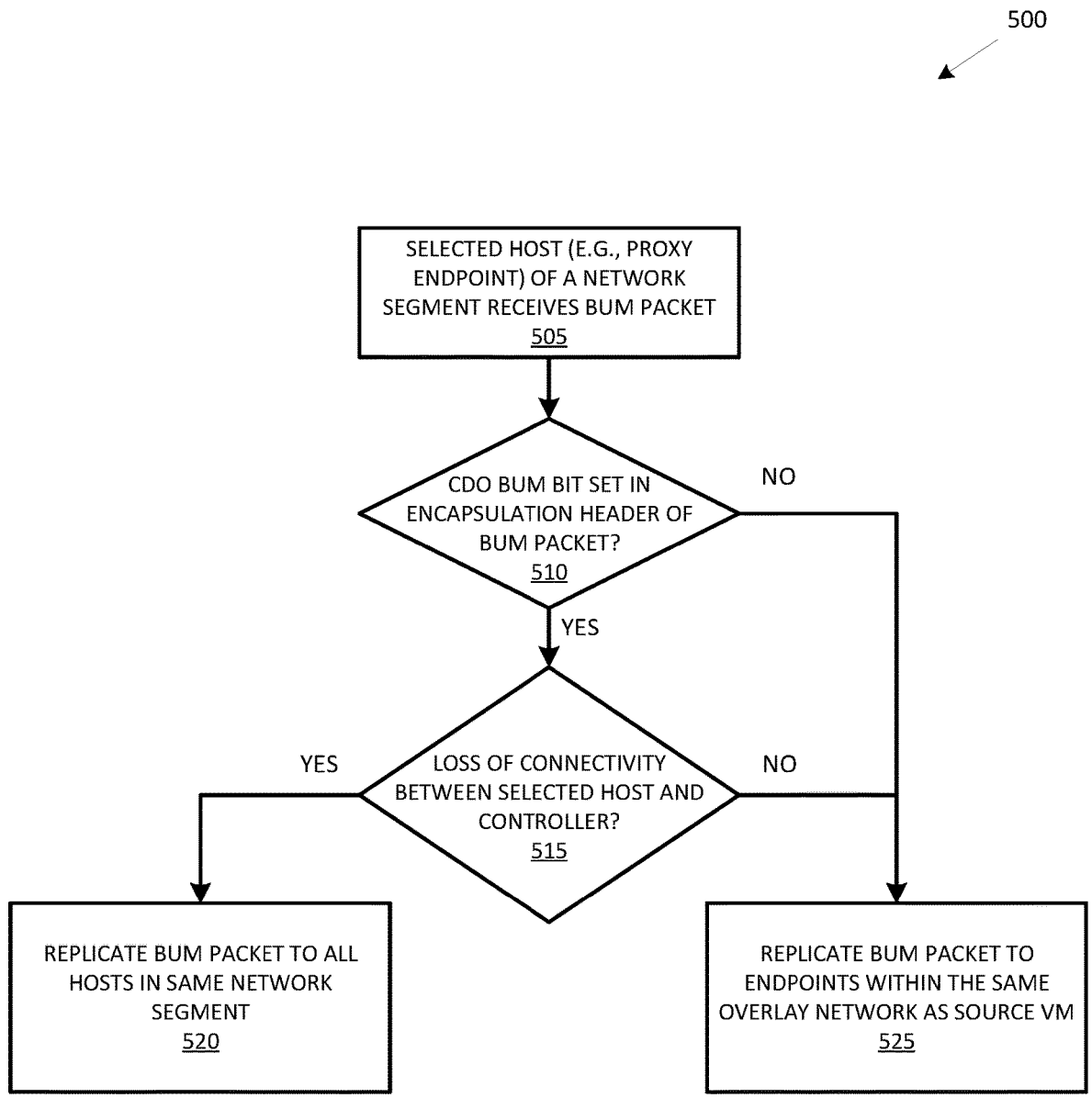
FIG. 5 is a flow chart illustrating an exemplary method of replicating data packets by selected host within a network segment in a computing environment.

FIG. 5 is a flow chart illustrating exemplary method 500 of replicating data packets by selected host 105 within a network segment in computing environment 100.

At block 505, selected host 105 (e.g., proxy endpoint) receives a BUM packet originating from source VM 110. In one embodiment, source VM 110 selected host 105 to receive the BUM packet using method 300, as described above.

At block 510, selected host 105 determines whether CDO BUM bit (e.g., 407) in the encapsulation header of the BUM packet has been set. CDO BUM bit 407 being set indicates to selected host 105 that the received data packet is a BUM packet from host 105 currently in the CDO state. When CDO BUM bit 407 has been set, the flow proceeds to block 515. When CDO BUM bit 407 has not been set, the flow proceeds to block 525.

At block 515, selected host 105 determines whether there is a loss of connectivity along communication channel 112 between controller 103 and selected host 105. When there is a loss of connectivity between controller 103 and selected host 105, the flow proceeds to block 520. When there is not a loss of connectivity between controller 103 and selected host 105, the flow proceeds to block 525.

At block 520, selected host 105 replicates the BUM packet and distributes a copy of the BUM packet to each of one or more other hosts 105 within the same network segment as selected host 105 having the same control VNI as host 105 on which source VM 110 resides. In one embodiment, selected host 105 determines hosts 105 within the same network segment by identifying hosts 105 with the same network segment identifier.

At block 525, selected host 105 replicates the BUM packet and distributes a copy of the BUM packet to the VTEP of each endpoint (e.g., VMs 110 or DCNs) within the same overlay network as source VM 110. In one embodiment, selected host 105 determines the endpoints to receive a replicated copy of the BUM packet by identifying hosts 105 with the same VNI as source VM 110.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples, operations, and/or that blocks with solid borders are not optional in some embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
receiving, by a first host from a network controller, a list of hosts that include data compute nodes that are members of a first overlay network, the first overlay network having a first virtual network identifier (VNI);
determining, by the first host, that a first data compute node hosted by the first host generated a data packet for transmission to one or more other data compute nodes, wherein the first data compute node and the other data compute nodes are members of the first overlay network;
detecting, by the first host, loss of connectivity between the first host and the network controller;
determining whether a loss of connectivity with the network controller has occurred;

when a loss of connectivity with the network controller has occurred:
  selecting one or more hosts that are members of a control logical network, the control logical network being a second overlay network having a second VNI that is specific to the control logical network, wherein the members of the control logical network include hosts configured to receive the list regardless of whether or not each of the hosts is currently running a data compute node that is a member of the first overlay network; and
  transmitting the data packet to the selected one or more hosts that are members of the control logical network, wherein the selected one or more hosts are configured to forward the data packet to one or more other hosts having the one or more other data compute nodes; and
when a loss of connectivity with the network controller has not occurred, forwarding, from the first host, the data packet to the one or more other hosts having the one or more other data compute nodes.

2. The computer-implemented method of claim 1, wherein selecting the one or more hosts that are members of the control logical network is further in response to the data packet being a Broadcast, Unknown Destination, or Multicast (BUM) packet.

3. The computer-implemented method of claim 2, wherein selecting the one or more hosts that are members of the control logical network comprises:
  determining that the data packet is to be transmitted to a plurality of data compute nodes in a group of hosts, the group of hosts identified by a network segment identifier;
  selecting one host within the group of hosts identified by the network segment identifier; and
  setting a bit in an encapsulation header of the data packet, the setting of the bit in the encapsulation header indicating to the selected one or more hosts that the first host is in a controller disconnected operating state, wherein when there is loss of connectivity between the selected one or more hosts and the network controller, the selected one or more hosts distributes replicated copies of the data packet to all hosts associated with the network segment identifier and the control logical network, and wherein when there is no loss of connectivity between the selected one or more hosts and the network controller, the selected one or more hosts distributes replicated copies of the data packet to endpoints in the first overlay network associated with the network segment identifier.

4. The computer-implemented method of claim 3, wherein selecting one host within the group of hosts further includes the first host selecting a host within the group of hosts that was running a data compute node that was designated as a member of the first overlay network at a time of the loss of connectivity between the first host and the network controller.

5. The computer-implemented method of claim 1, further comprising:
  receiving an indication of a new data compute node joining the first overlay network; and
  updating a data structure to store information regarding membership of the new data compute node in the first overlay network.

6. The computer-implemented method of claim 1, wherein the loss of connectivity between the first host and the network controller is detected prior to receiving an update to the list from the network controller.

7. The computer-implemented method of claim 1, wherein the selected one or more hosts are not currently running a data compute node that is a member of the first overlay network.

8. A non-transitory computer-readable medium storing instructions, which when executed by a processing device, cause the processing device to perform a method comprising:
  receiving, by a first host from a network controller, a list of hosts that include data compute nodes that are members of an overlay network, the overlay network a first virtual network identifier (VNI);
  determining, by the first host, that a first data compute node hosted by the first host generated a data packet for transmission to one or more other data compute nodes, wherein the first data compute node and the other data compute nodes are members of the overlay network;
  detecting, by the first host, loss of connectivity between the first host and the network controller;
  in response to the first host detecting the loss of connectivity with the network controller, selecting one or more hosts that are members of a control logical network, the control logical network having a second VNI that is specific to the control logical network, wherein the members of the control logical network include hosts configured to receive the list regardless of whether or not each of the hosts is currently running a data compute node that is a member of the overlay network; and
  transmitting the data packet to the selected one or more hosts that are members of the control logical network, wherein the selected one or more hosts are configured to forward the data packet to one or more other hosts having the one or more other data compute nodes.

9. The non-transitory computer-readable medium of claim 8, wherein selecting the one or more hosts that are members of the control logical network is further in response to the data packet being a Broadcast, Unknown Destination, or Multicast (BUM) packet.

10. The non-transitory computer-readable medium of claim 9, wherein selecting the one or more hosts that are members of the control logical network comprises:
  determining that the data packet is to be transmitted to a plurality of data compute nodes in a group of hosts, the group of hosts identified by a network segment identifier;
  selecting one host within the group of hosts identified by the network segment identifier; and
  setting a bit in an encapsulation header of the data packet, the setting of the bit in the encapsulation header indicating to the selected one or more hosts that the first host is in a controller disconnected operating state, wherein when there is loss of connectivity between the selected one or more hosts and the network controller, the selected one or more hosts distributes replicated copies of the data packet to all hosts associated with the network segment identifier and the control logical network, and wherein when there is no loss of connectivity between the selected one or more hosts and the network controller, the selected one or more hosts distributes replicated copies of the data packet to endpoints in the overlay network associated with the network segment identifier.

11. The non-transitory computer-readable medium of claim 10, wherein selecting one host within the group of hosts further includes the first host selecting a host within the group of hosts that was running a data compute node that was designated as a member of the overlay network at a time of the loss of connectivity between the first host and the network controller.

12. The non-transitory computer-readable medium of claim 8, further comprising: receiving an indication of a new data compute node joining the overlay network; and updating a data structure to store information regarding membership of the new data compute node in the overlay network.

13. The non-transitory computer-readable medium of claim 8, wherein the network controller is network interface controller.

14. The non-transitory computer-readable medium of claim 8, wherein in response to the loss of connectivity between the first host and a network controller, the network controller designates the first host as being disconnected, and wherein the first host is maintained as the member of the overlay network until a timeout period lapses.

15. An apparatus comprising:
a processing device; and
a memory coupled to the processing device, the memory storing instructions which, when executed by the processing device, cause the apparatus to:
receiving, by a first host from a network controller, a list of hosts that include data compute nodes that are members of an overlay network, the overlay network having a first virtual network identifier (VNI);
determine, by the first host, that a first data compute node hosted by the first host generated a data packet for transmission to one or more other data compute nodes, wherein the first data compute node and the other data compute nodes are members of the overlay network;
detect, by the first host, loss of connectivity between the first host and the network controller;
determining whether a loss of connectivity with the network controller has occurred:
when a loss of connectivity with the network controller has occurred:
select one or more hosts that are members of a control logical network, the control logical network having a second VNI that is specific to the control logical network, wherein the members of the control logical network include hosts configured to receive the list regardless of whether or not each of the hosts is currently running a data compute node that is a member of the overlay network; and transmit the data packet to the selected one or more hosts that are members of the control logical network.

16. The apparatus of claim 15, wherein selecting the one or more hosts that are members of the control logical network is further in response to the data packet being a Broadcast, Unknown Destination, or Multicast (BUM) packet.

17. The apparatus of claim 16, wherein selecting the one or more hosts that are members of the control logical network comprises:
determining that the data packet is to be transmitted to a plurality of data compute nodes in a group of hosts, the group of hosts identified by a network segment identifier;
selecting one host within the group of hosts identified by the network segment identifier; and
setting a bit in an encapsulation header of the data packet, the setting of the bit in the encapsulation header indicating to the selected one or more hosts that the first host is in a controller disconnected operating state, wherein when there is loss of connectivity between the selected one or more hosts and the network controller, the selected one or more hosts distributes replicated copies of the data packet to all hosts associated with the network segment identifier and the control logical network, and wherein when there is no loss of connectivity between the selected one or more hosts and the network controller, the selected one or more hosts distributes replicated copies of the data packet to endpoints in the overlay network associated with the network segment identifier.

18. The apparatus of claim 17, wherein selecting one host within the group of hosts further includes the first host selecting a host within the group of hosts that was running a data compute node that was designated as a member of the overlay network at a time of the loss of connectivity between the first host and the network controller.

19. The apparatus of claim 15, wherein the instructions further cause the apparatus to:
receive an indication of a new data compute node joining the overlay network; and
update a data structure to store information regarding membership of the new data compute node in the overlay network.

20. The apparatus of claim 15, wherein the list is an updated list of a previous list.

* * * * *